United States Patent
Srinivasan

(10) Patent No.: US 12,541,646 B2
(45) Date of Patent: Feb. 3, 2026

(54) IDENTIFYING COMPUTING ISSUES UTILIZING USER COMMENTS ON SOCIAL MEDIA PLATFORMS

(71) Applicant: PAYPAL, INC., San Jose, CA (US)

(72) Inventor: Sriram Srinivasan, Chennai (IN)

(73) Assignee: PAYPAL, INC., San Jose, CA (US)

( * ) Notice: Subject to any disclaimer, the term of this patent is extended or adjusted under 35 U.S.C. 154(b) by 392 days.

(21) Appl. No.: 18/146,165

(22) Filed: Dec. 23, 2022

(65) Prior Publication Data

US 2024/0211695 A1 Jun. 27, 2024

(51) Int. Cl.
*G06F 40/30* (2020.01)
*G06Q 50/00* (2012.01)

(52) U.S. Cl.
CPC .............. *G06F 40/30* (2020.01); *G06Q 50/01* (2013.01)

(58) Field of Classification Search
None
See application file for complete search history.

(56) References Cited

U.S. PATENT DOCUMENTS

| | | | |
|---|---|---|---|
| 11,797,762 B1* | 10/2023 | Kats | H04L 51/52 |
| 12,020,265 B1* | 6/2024 | Mao | G06Q 30/0243 |
| 2023/0081372 A1* | 3/2023 | Hartman | G16H 50/20 |
| | | | 705/2 |
| 2023/0161957 A1* | 5/2023 | Li | G06N 20/00 |
| | | | 704/9 |

* cited by examiner

*Primary Examiner* — Quynh H Nguyen
(74) *Attorney, Agent, or Firm* — Haynes and Boone, LLP (70481)

(57) ABSTRACT

Methods and systems described herein may implement operations for identification of computing issues on computing platforms using social media comments and other available data in a variety of environments. An online transaction processor may provide operations for electronic transaction processing and/or other online computing services. The online transaction processor may monitor social media posts in order to determine if context and sentiments from such posts may indicate that there is a potential issue or complaint by users with computing services provided by the online service provider. This may be done by processing the posts using a machine learning engine for sentiment analysis and correlating sentiments with corresponding computing signals occurring with computing platforms of the service provider. Thereafter, computing anomalies may be detected and output notifications may be provided to users based on the corresponding computing anomalies.

20 Claims, 5 Drawing Sheets

IDENTIFYING COMPUTING ISSUES UTILIZING USER COMMENTS ON SOCIAL MEDIA PLATFORMS

TECHNICAL FIELD

The present disclosure generally relates to computing issue identification and hardware and software related thereto. More specifically, the present disclosure relates to systems and methods for implementing a platform to analyze and process social media comments using intelligent engines for identifying computing issues.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. When providing these computing services, the service provider may utilize decision services, which may correspond to micro-computing services having rule-based and/or machine learning (ML)-based engines, computing nodes, execution paths, and the like to process data requests and loads for different outputs (e.g., authentication, risk or fraud analysis, electronic transaction processing, etc.). Distributed systems may be powered by thousands of hardware and software components (e.g., applications, services, computes, networks, storages, etc.). Despite having powerful observability systems, various issues or problems may still occur. These are real customer problems and can be local, regional, and/or global with regard to location, internet service provider, IP location, social media location, or the like. However, service providers may have limited visibility into what goes to the customer once it exits a data center and may not be able to identify and address a problem before it reaches the point of affecting customer satisfaction. Thus, it is desirable for service providers to resolve computing issues in real-time before those issues make an impact or reducing the severity of the impact, thereby keeping website and application resiliency and retaining user satisfaction.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
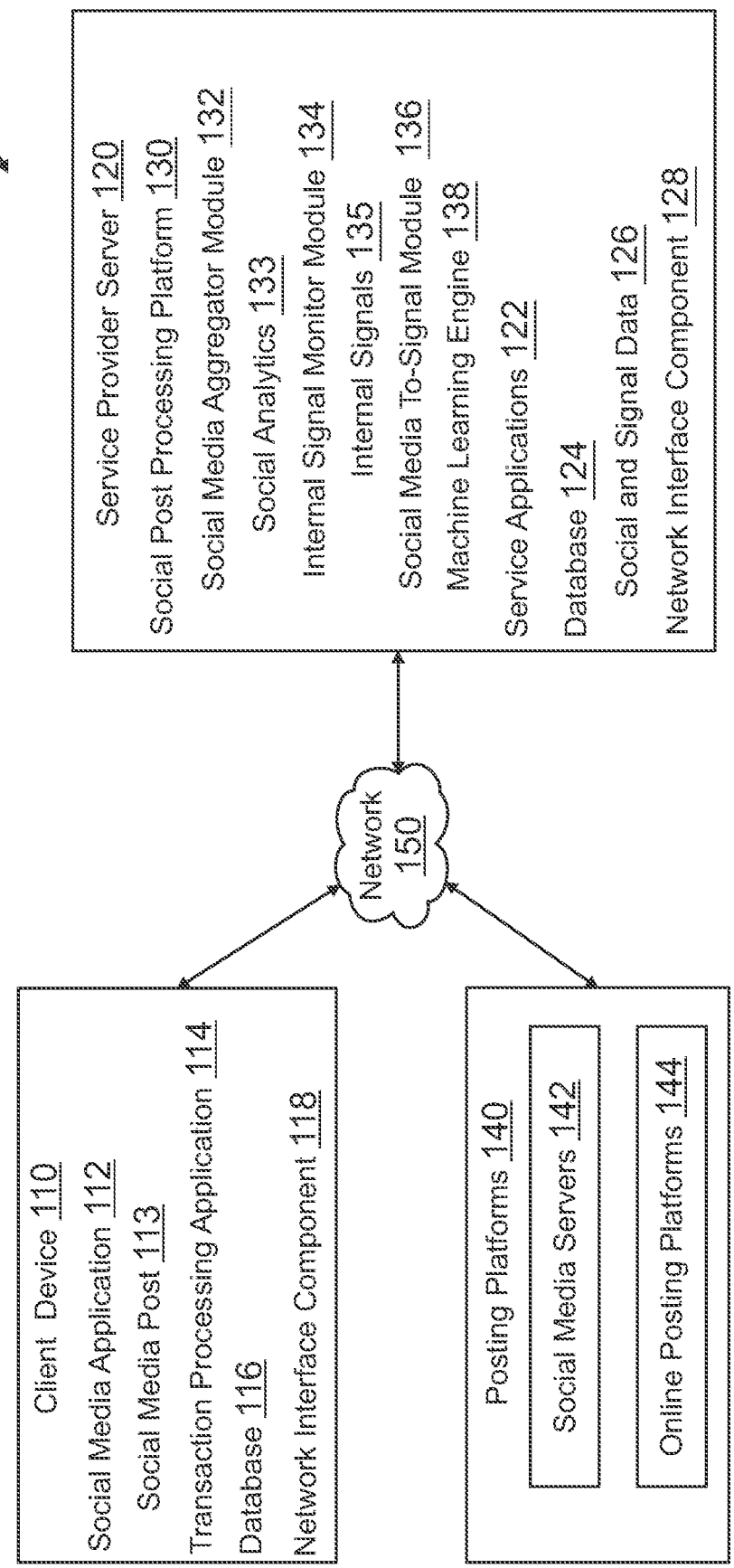
FIG. 1 illustrates a block diagram of a networked system suitable for implementing the processes described herein, according to an embodiment.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made, without departing from the scope described herein. Various aspects are capable of other embodiments and of being practiced or being carried out in various different ways.

Provided are methods utilized for identifying computing issues utilizing user comments on social media platforms. Systems suitable for practicing methods of the present disclosure are also provided.

A user may utilize online service providers, such as transaction processors, via their available online and networked platforms. For example, a user may make a payment to another user or otherwise transfer funds using the online platforms of the service providers. In this regard, a user may process a transaction, such as for a payment to another user or a transfer, using an account and/or digital wallet provided to the user by a service provider. An application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more transactions with a recipient, such as a recipient account or digital wallet that may receive an amount of a payment. When engaging in these interactions, the service provider may provide decision services that may be used to process data requests and data loads and provide a decision or other output, which may be used in conjunction to provide computing services to users. In some environments and/or conditions, multiple decision services may utilize the same data load, such as an account balance, account login name, contact identifier, user input for the data request, profile or transaction history, or the like. A computing architecture may function to analyze reports by customers and other users of the service provider across multiple platforms from social media comments and resolve them promptly in real time using machine learning (ML), neural network (NN), and other artificial intelligence (AI) engines.

In this regard, the operations may be performed by identifying an issue through anomaly detection using and through social media posts and comments and/or number of social media views, reposts, shares, or the like. The issue may be identified based on a trend in the social media comments, such as if identified social media posts and/or comments have met or exceeded a threshold, a moving average, and the like. However, other metrics may also be monitored for a potential issue, such nonlinear increases in comments (e.g., an exponential increase over time and/or a sudden spike). In this regard, a linear increase over time and/or within a tolerable range may not be indicative of an issue, such as if a service or product becomes increasingly popular and/or is associated with an anticipated or popular release. Social media posts and comments may correspond to those having text, images, emojis, Graphics Interface Format (GIF) digital file (e.g., animation, short clip or video, etc.), and the like. Further social media posts may also include news articles, reviews, content sites such as Reddit, certain webpages showing outages in service, and/or other sources.

With the proliferation and widespread use of social networks, comments (both negative and positive) posted on such networks are becoming more and more frequent. At regular or set intervals (e.g., every 3 minutes or other time period), as well as asynchronous or triggered on an event, the service provider may monitor a number of social media comments that may be associated with the service provider. These comments may be from Twitter, Down Detector, Disqus forums, Facebook, Instagram, Youtube, news articles, reviews, content sites such as Reddit, certain webpages showing outages in service, and the like, which may be processed for any uptick in customer and/or user comments. The service provider may then execute and run ML and/or other AI operations for anomaly detection on the number of social media comments. For example, if there may be an anomaly/uptick in the number of comments, there may be an ongoing issue and/or problem with a computing service provided by the service provider.

Thereafter, the social media comments may be aggregated, monitored, and/or collected from one or more corresponding social media websites and/or platforms. This may be performed in order to determine that there may be a customer/user issue, but further to determine the corresponding issue with the computing platforms. ML and other AI engines (e.g., rule-based engines that may not utilize ML) may be used in order to determine the computing issue that is down/impaired and information about the issue. This may be done by analyzing social media comments, text data, image data, emojis and/or other graphical uploads, and the like to determine a sentiment and/or issue with the service provider's computing platform(s). For example, the issue and impacted computing product or service may be identified using ML models and/or a set of rules. The service provider may process social media comments and other social media posts in order to perform text mining, sentiment analysis, and/or summarization of such social media data. This may be done through abstractive summarization, such as summarizing the issue presented in the social media post but through different words, data, vectorization, or the like. The ML model and/or rule-based engine may therefore provide different text and/or data that may be shorter than the original text and/or social media post. For example, a Hugging Face's summarization algorithm(s) may be available to perform such operations.

Abstractive summarization may be performed from negative sentiments through a sentiment analysis per tweet/comment/other social media post, which may associate a positive or negative classification and a confidence score towards the classification. This may be done with one or more ML models trained for sentiment analysis.

Once a sentiment analysis is processed and/or completed, there may be a correlation and/or identification of the positive versus the negative sentences, comments, posts, and/or other social media data. For example, within each set of social media data, sentences with low confidence scores may be filtered to be kept in a "positive-neutral" or "negative-neutral" sentiment. From negative or neutral sentences, the service provider may perform an abstractive summarization for finding prominent words (common terms and the like). For example, the words or combination of words that appeared often (barring some keywords like the service provider name or identifier, etc.). This can be common terms or term frequency—inverse document frequency (TF-IDF) (which may include with N-Grams applied). Further, there may be application of Levenshtein distance and Phonetic Similarity algorithms for various computing and linguistic languages. This may not include correlating with internal signals and/or external third-party signals, messages, or other data. Instead, the ML model may provide two or more outcomes. For example, with two outcomes, first a summary of the issue from the customers may be determined by processing social media comments. The collected, scrapped, or otherwise determined social media comments for the window may be processed to determine negative comments using one or more ML models and/or operations. The issue may be identified using abstractive summarization or other ML technique. An example may be, "could not send money to family". Thereafter, with the second outcome, a product that is reported may be identified by finding prominent words (e.g., common terms) or by clustering of available products. The same or similar social media comments from the first outcome may be processed to identify the product. For example, a product that is reported may be "Send Money".

A corpus of service provider products, computing platforms, resources, and/or capabilities may be determined, which may then be correlated to the tweets and comments. Correlation may be done with one or more ML models, K-Means or DBSCAN clustering, or the like. The social media comments may be used to identify the impacted product or capability. For example, the service provider may have products and capabilities for computing services and platforms (e.g., "Send Money", "Receive Money", "Checkout", etc.). The ML model and system may identify which of these products are reported sufficiently (e.g., at or over a threshold number, percentage, over time, linear or other increase over time, etc.) in the social media comments Further, external or third-party issues may be identified utilizing a list of dependent external parties, which may be utilized to determine which ones of those parties are reporting an uptick of social media comment numbers at the same or similar time to the identified uptick by the service provider and/or ML engines. The service provider may then run a same or similar anomaly detection (e.g., moving average, etc.) on the number of social media posts, comments, data, and the like that may be posted and/or provided by users and other entities through online platforms. The service provider may determine and/or filter internal versus external issues, such as external network issues that may be affecting multiple service providers or internal computing platform issues. In order to identify issues specific to the service provider and/or with internal computing systems, the social media comment may be correlated with internal signals. For example, internal signals may be associated with accounts, internal data processing (e.g., risk analysis, authentication, electronic transaction processing, messaging, account services, etc.), service requests and other assistance communications, network traffic logs and other log files (e.g., event, server, system, resource, threat, etc., logs), and other available signaling that may occur on an online digital platform of the service provider. In this regard, account signal data may include total payment volume (TPV), logins, notifications, etc. Other signaling may be associated with updates, new versioning of applications, deployment of applications and other components, and the like, which may be associated with manual and automatic changes that to the service provider's website and/or platform.

The service provider may identify changes around the start time of the trend and/or identification of social media comments, and then run ML based risk scoring algorithms to identify riskier changes for manual evaluation by one or more administrators or data scientists. The trend analysis of internal signals along with riskier changes may therefore be analyzed and/or identified using social media posts, comments, and other data. Riskier changes may correspond to those changes that may be made to core computing services and/or microservices, frontend user interfaces and/or applications that users commonly interact with and utilize, backend components and/or data storage that is critical for certain computing services, and the like. Riskier changes may also correspond to those that may deploy a new application, service, database or set of data, or the like, as well as significant version changes, which may be likely to affect the service provider's computing applications and platform(s). The approach may involve superimposing various graphs in a timeline fashion for a timeline, period, or window (e.g., 30 minutes backwards) and find out which one matches with an alert time. This may be plotted against the executed time and tagged. Additionally, a health check on important internal systems (TPV, Logins, Notifications, etc.) for the alert window (e.g., alert time—30 minutes), may be performed, and a shortlist of those that are negative during the alert window may be flagged for additional review.

This may provide real-time analytics of computing issues with service provider platforms. For example, service providers may have little visibility into such computing issues in real-time that are occurring with users and customers. Utilizing the processing of social media data, the issues may be reported directly to customer service centers in real-time or near real-time through comments/feedback in social media. Using sentiment analysis, ML models, AI including rule-based engines, and other text and/or image processing operations, feedback from users via social media posts may be processed faster and through different languages and demographic differences. Thus, the service provider may process the social media posts to identify the common issue that customers and other users are collectively reporting in their own language and in their own words. This may also be used to determine if there are any common relations between regions, languages, and/or demographics. For example, the service provider may identify issues with card processors, gateways, banks, etc. easily and if there are not any external issues, the service provider may check internally for any changes made to the website or find the erroring application/service/hardware/software component that may be at issue.

Using the computing services provided by the service provider, such as an online transaction processor, the user may engage in and/or utilize one or more applications and websites to process data, interact with other users, devices or online resources, or otherwise interact with the computing services. For example, the user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. Thereafter, the account and/or digital wallet may be used for electronic transaction processing. Each of these operations and processes may utilize a decision service, microservice, platform, components, and/or processors, which may be monitored, and issues detected, using the aforementioned procedures for use of social media posts and internal signaling.

Implementations of the present disclosure will now be described in detail with reference to the accompanying Figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110, a service provider server 120, and posting platforms 140 in communication over a network 150. Client device 110 may be used to interact with and/or process transactions using service provider server 120. During interactions, client device 110 may facilitate social networking and/or media interactions vis posting platforms 140, which may provide some data or information regarding services and products provided by service provider server 120. Service provider server 120 may facilitate recommendations for adjustment of such products and/or identification of product issues based on such social networking and/or media posts.

Client device 110, service provider server 120, and posting platforms 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 1000, and/or accessible over network 150.

Client device 110 may be implemented using any appropriate hardware and software configured for wired and/or wireless communication with service provider server 120 for processing payments and transactions including purchasing, selling, or otherwise transacting utilizing computing services provided by service provider server 120. Client device 110 may correspond to an individual user, consumer, or merchant that utilizes a payment network and platform provided by service provider server 120 to process those transactions associated with service provider server 120. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing devices may function similarly.

Client device 110 of FIG. 1 contains an application 112, a transaction processing application 114, a database 116, and a network interface component 118. Application 112 may correspond to executable processes, procedures, and/or applications with associated hardware. In other embodiments, client device 110 may include additional or different software as required.

Application 112 may correspond to one or more processes to execute modules and associated devices of client device 110 to provide a convenient interface to permit a user of client device 110 to engage in social networking and/or otherwise provide social media post 113. This may include accessing a social media platform and/or service and engage in social networking with other users by posting text, images, emojis, GIFs, and the like, as well as responding to other social media posts by commenting, private or public messaging, linking to other users and/or posts, and the like. In this regard, application 112 may correspond to specialized hardware and/or software utilized by client device 110 that may provide social networking services to engage in social networking by posting social media post 113. Digital assets may be available to the user in a digital wallet accessible via application 112 and/or via one or more websites and/or other applications and may further be used to transact on digital platforms (e.g., exchanges) and/or with real-world devices (e.g., POS devices, merchant or financial services devices, etc.). In some embodiments, the transaction may be to process a payment or sale of one or more of digital assets, where those transactions may be based on computing services provided by service provider server 120. This may be based on a transaction generated by application 112 for digital assets. For example, a transaction may be generated by service provider server 120, or electronic transaction processing may be requested when client device 110 and one or more other devices interact to perform electronic transaction processing.

In this regard, application 112 may be used to further post and/or provide social media regarding usage of computing services, payment engines and products, one or more digital assets and/or underlying virtual objects or components. The posts, such as social media post 113, may be in response to one or more interactions by the user corresponding to client device 110 with such computing service and products, and may indicate an issue, complaint, approval, or the like with such services and products. Social media post 113 may then be processed to determine whether any changes may be recommended and/or implemented with such services and/or products. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website, including payment information for the transaction. However, in other embodiments, application 112 may include a dedicated application of service provider server 120 or other entity, which may be configured to assist in processing transactions, such as a mobile application on a mobile device.

Transaction processing application 114 may correspond to one or more processes to execute modules and associated devices of client device 110 to provide a convenient interface to permit a user of client device 110 to enter, view, and/or process transactions, such as by using a digital wallet having digital assets. In this regard, application 112 may correspond to specialized software utilized by a user of client device 110 that may be used to access a website or application (e.g., mobile application, rich Internet application, or resident software application) that may display one or more user interfaces that allow for interaction with the computing services of service provider server 120, such as those associated with electronic transaction processing. In various embodiments, transaction processing application 112 may be associated with account information, user financial information, and/or transaction histories. For example, transaction processing application 112 may also be used by a first user to provide payments and transfers to a second user or merchant. Transaction processing application 112 may utilize user financial information, such as credit card data, bank account data, or other funding source data, as a payment instrument when providing payment information. Additionally, transaction processing application 112 may utilize a digital wallet associated with an account with a payment provider as the payment instrument, for example, through accessing a digital wallet or account of a user through entry of authentication credentials and/or by providing a data token that allows for processing using the account. In some embodiments, transaction processing application 112 may be used to request electronic transaction processing by providing authentication credentials, a digital token, account data, and/or a financial instrument for payment processing with a transaction. Transaction processing application 112 may also be used to receive a receipt or other information based on transaction processing.

Client device 110 may include additional applications to provide features to client device 110. For example, additional applications may include security applications for implementing client-side security features, programmatic client applications for interfacing with appropriate application programming interfaces (APIs) over network 150, or other types of applications. Additional applications may include email, texting, voice and IM applications that allow a user to send and receive emails, calls, texts, and other notifications through network 150. Additional applications may also include other location detection applications, which may be used to determine a location for client device 110, such as a mapping application. Additional applications may include device interface applications and other display modules that may receive input from the user and/or output information to the user. For example, additional applications may contain software programs, executable by a processor, including a graphical user interface (GUI) configured to provide an interface to the user. Additional applications may therefore use components of client device 110, such as display components capable of displaying information to users and other output components, including touch screen interfaces, speakers, and the like Client device 110 may further include database 116 which may include, for example, identifiers such as operating system registry entries, cookies associated with application 112 and/or other applications, identifiers associated with hardware of client device 110, or other appropriate identifiers. Identifiers in database 116 may be used by a payment/service provider to associate client device 110 with a particular account maintained by the payment/service provider. Database 116 may also further store received transaction data and/or data for transactions associated with social media post 113, as well as other data that may be transmitted in association with social media post 113.

Client device 110 includes at least one network interface component 118 adapted to communicate with service provider server 120 and/or other devices or servers over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for recommending and/or processing options for software and/or online platform associated with issues identified from social networks and social media posts. In such embodiments, service provider server 120 may interface with client device 110 to identify and process issues in computing platforms based on social media posts. Service provider server 120 includes one or more processing applications which may be configured to interact with client device 110. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a social post processing platform 130, service applications 122, a database 124, and a network interface component 128. Social post processing platform 130 and/or service applications 122 may correspond to executable processes, procedures, and/or applications with associated hardware. In other embodiments, service provider server 120 may include additional or different modules having specialized hardware and/or software as required.

Social post processing platform 130 may correspond to one or more processes to execute software using associated hardware components of service provider server 120 to process and utilize social media posts (e.g., for one or more of social analytics 133 that may be used to determine recommendations for updating and/or analyzing issues in software, digital platforms, and/or applications of service provider server 120. Social post processing platform 130 may include a social media aggregator module 132, internal signal monitor module 134, social media-to-signal module 136, and machine learning engine 138. In this regard, social post processing platform 130 may interface with posting platform 140, such as social media servers 142 and/or online posting platforms 144, to determine social media posts and other online data that may be monitored, scraped, logged and/or extracted from computing logs (e.g., network traffic, server, etc., logs that may be provided and/or available to social media aggregator module 132), or otherwise accessed. In some embodiments, social media aggregator module 132 may access and receive data for social media posts from a data store or other big data storage system. Social media aggregator module 132 may determine social analytics 133 by analyzing and/or receive analytics of (e.g., from a third-party or external data processor) of the social media posts, which may include semantics, sentiments, image analysis, and the like. In this regard, social media aggregator module 132 may include a natural language processor, text miner and/or converter based on text analytics, image processor, optical character recognition process, object recognition process, and the like to determine social analytics 133.

Internal signals 135 may be collected and/or aggregated by internal signal monitor module 134 of service provider server 120 by monitoring internal computing signals and/or usage, which may include network signals, exchanged data, database calls, and the like. Internal signal monitor module 134 may correspond to one or more applications, operations, and/or components that may monitor, collect, aggregate, and store internal computing signaling between different components, communications by components and/or internal users, testing and/or deployment of new applications and services (as well as new or updated versions of such applications and services), data storage and/or access requests, and the like. Internal signals 135 may be indicative of a computing issue, such as failures or slowdowns (e.g., degradation in performance) in frontend or backend applications, services and/or interfaces.

In some embodiments, social post processing platform 130 may correspond to a data processing platform where the social media posts and/or social analytics 133 with internal signals 135 may be processed by machine learning (ML) engines 138 in order to provide recommendations and/or outputs for ongoing issues in computing platforms and applications. Social media-to-signal module 136 may receive social media posts and internal signals 135, which may be used to determine such recommendations, outputs, or predictions of issues, failures, slowdown or degradation, overburdening, bandwidth changes to computing applications and platforms using one or more ML models, as well as other rule-based and/or data processing operations and engines. Social media-to-signal module 136 may perform these operations through correlating social analytics 133 to internal signals 135. For example, ML models (as well as neural networks (NNs)) used by Social media-to-signal module 136 may be trained to take, as input, features associated with social media posts from social analytics 133 and internal signals 135 to output a prediction (e.g., true or false) or score (which may be compared to a threshold) of whether social media posts by one or more users indicate that internal signals 135 correspond to an issue in computing services, applications, and/or components of service provider server 120 (e.g., an issue in service applications 122). With other AI engines used by social media-to-signal module 136, rules may be set and/or established, as well as data processing flows, that correlate social analytics 133 with internal signals 135 to identify and determine the same or similar computing issues, such as through a rule-based engine. In this regard, social media posts may be processed to determine social analytics 133 based on user sentiments and reactions to usages of applications and digital platforms of service provider servicer 120 by social media aggregator module 132. Internal signal monitor module 134 may provide internal signals 135 for processing One or more ML models for ML engine 138 may be trained to take, as input, at least social media posts and/or data for such posts (e.g., a data set of social media posts and/or comments to the posts, as well as social analytics 133) and internal signals 135 using ML engine 138 and output a recommendation, prediction, or scoring associated with whether internal signals 135 are associated with a computing issue, error, failure, offline status, or the like for frontend and/or backend applications and services of service provider server 120 that is indicated by the social media posts. ML models of ML engine 138 may each include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that attempt to classify or whether predict social analytics 133 and internal signals 135 indicate whether there is an issue with a computing service and/or (e.g., at least a prediction and/or recommendation based on a potential computing issue in an application, website, or on a computing platform).

Thus, when ML models are used to perform a predictive analysis and output, the input may provide a corresponding output based on the classifications, scores, and predictions trained for ML models. The output may correspond to a recommendation and/or action that service provider server 120 may determine in order to identify issues in computing services, applications, interfaces, and/or other components and platforms of service provider server 120. Such recommendations may correspond to predictions (e.g., true/false) and/or scores (e.g., to be compared to a threshold score for identifying whether there is an issue). The output of the ML models may be based on social media posts and/or social analytics with internal signals 135. By providing training data to train ML models, the nodes in the hidden layer may be trained (adjusted) such that an optimal output (e.g., a classification) is produced in the output layer based on the training data. By continuously providing different sets of training data and penalizing ML models when the output of ML models is incorrect, ML models (and specifically, the representations of the nodes in the hidden layer) may be trained (adjusted) to improve its performance in data classification. Adjusting ML models may include adjusting the weights associated with each node in the hidden layer. Thus, the training data may be used as input/output data sets that allow for ML models to make classifications based on input attributes.

Once trained and/or created, the ML models of machine learning engine 138 may be used to generate outputs based on social media posts, social analytics and internal signals 135. For example, social analytics for identification and/or recommendations of software issues may be generated based on at least social media posts and/or comments for social media posts, which may be user-specific, customer-specific, merchant-specific, or other specific group of users. Social analytics 133 may be provided to determine one or more recommendations on computing issues and/or resolution of such issues. This may be done by transmitting via one or more communication channels and/or providing data accessible from database 124. Further, social analytics 133 may be tokenized, where a digital token may be generated and provided via a service provider server 120. ML engine 138 may be trained by using training data associated, as well as the aforementioned features. By providing training data to train ML models for machine learning engine 138, the nodes in the hidden layer may be trained (adjusted) such that an optimal output (e.g., a classification) is produced in the output layer based on the training data. Thus, the training data may be used as input/output data sets that allow for ML models of machine learning engine 138 to make classifications based on input attributes.

The output classifications for an ML model trained for machine learning engine 138 may be classifications of likelihood, benefit, cost, or the like for identifying computing issues with applications, online computing platforms, and the like. Although ML models are described above, other AI engines and operations may also or instead be used. For example, rule-based engines may also be used for data extraction and/or determination from social media posts to determine social analytics 133, such as through natural language processing, sentiment analysis, image analysis, optical character recognition, object recognition, and the like. Similarly, rule-based engines may be utilized for correlating social analytics 133 with internal signals 135 to determine whether there is an identifiable and/or reported computing issue occurring with service provider server 120. The rule-based engine may include rules, a scoring mechanism, threshold requirement for issue identification, processing flow of data, and the like to provide such an output. The operations and features of social post processing platform 130 are described in further detail with regard to FIGS. 2-4 below.

Service applications 122 may correspond to one or more processes to execute modules and associated specialized hardware of service provider server 120 to process a transaction or provide another service to customers, merchants, and/or other end users and entities of service provider server 120. In this regard, service applications 122 may correspond to specialized hardware and/or software used by service provider server 120 to provide computing services to users, which may include electronic transaction processing and/or other computing services using accounts provided by service provider server 120. In some embodiments, service applications 122 may be used by users associated with client devices 110 to establish user and/or payment accounts, as well as digital wallets, which may be used to process transactions. In various embodiments, financial information may be stored with the accounts, such as account/card numbers and information that may enable payments, transfers, withdrawals, and/or deposits of funds. Digital tokens for the accounts/wallets may be used to send and process payments, for example, through one or more interfaces provided by service provider server 120. The digital accounts may be accessed and/or used through one or more instances of a web browser application and/or dedicated software application executed by client devices 110 and engage in computing services provided by service applications 122. Computing services of service applications 122 may also or instead correspond to messaging, social networking, media posting or sharing, microblogging, data browsing and searching, online shopping, and other services available through service provider server 120.

In various embodiments, service applications 122 may be desired in particular embodiments to provide features to service provider server 120. For example, service applications 122 may include security applications for implementing server-side security features, programmatic client applications for interfacing with appropriate application programming interfaces (APIs) over network 150, or other types of applications. Service applications 122 may contain software programs, executable by a processor, including a graphical user interface (GUI), configured to provide an interface to the user when accessing service provider server 120 via one or more of client devices 110, where the user or other users may interact with the GUI to view and communicate information more easily. In various embodiments, service applications 122 may include additional connection and/or communication applications, which may be utilized to communicate information to over network 150.

Additionally, service provider server 120 includes database 124. Database 124 may store various identifiers associated with client device 110. Database 124 may also store account data, including payment instruments and authentication credentials, as well as transaction processing histories and data for processed transactions. Digital wallets, such as one available to and/or associated with client device 110 may be stored by database 124. Digital wallet, stored by database 124, may include data for accounts used for transaction processing and/or digital asset availability. Additionally, database 124 may further store social and signal data 126, which may be used to determine social media posts 132 and platform signals 135. Social and signal data 126 may be process by social post processing platform 130 in order to identify computing issues associated with service applications 122 and/or other computing services provided by service provider server 120.

In various embodiments, service provider server 120 includes at least one network interface component 128 adapted to communicate with client device 110 and/or another device/server for a merchant over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Posting platforms 140 may correspond to different online platforms where users may post data, respond to posts, and/or otherwise share content including text, images, videos, graphics, and the like. For example, posting platforms 140 may include social media servers 142, which may correspond to online platforms and services that allow users to network socially with other users and post social media content. The social media platforms provided by social media servers 142 may include Facebook, Twitter, Instagram, Reddit, and the like, as well as other media platforms including Youtube, Disqus forms, and the like. Social media posts may be monitored, scraped, and/or otherwise collected by service provider server 120, as well as comments, reposts, shares, likes or dislikes, and other responses. Posting platforms 140 may also include online posting platforms for other media content including news articles, reviews, content sites, certain webpages showing outages in service, and/or other sources. These may include posts by users, as well as comments and responses to posts by others and/or moderators, writers, and other users that provide content through online posting platforms 144. Such data may also be monitored and/or scraped from online posting platforms 144 by service provider server 120.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 1000.

Although various components of system 100 are described separately, functionality of the various components may be combined and/or performed by a single component and/or multiple computing devices in communication without departing from the invention.

Figure 2:
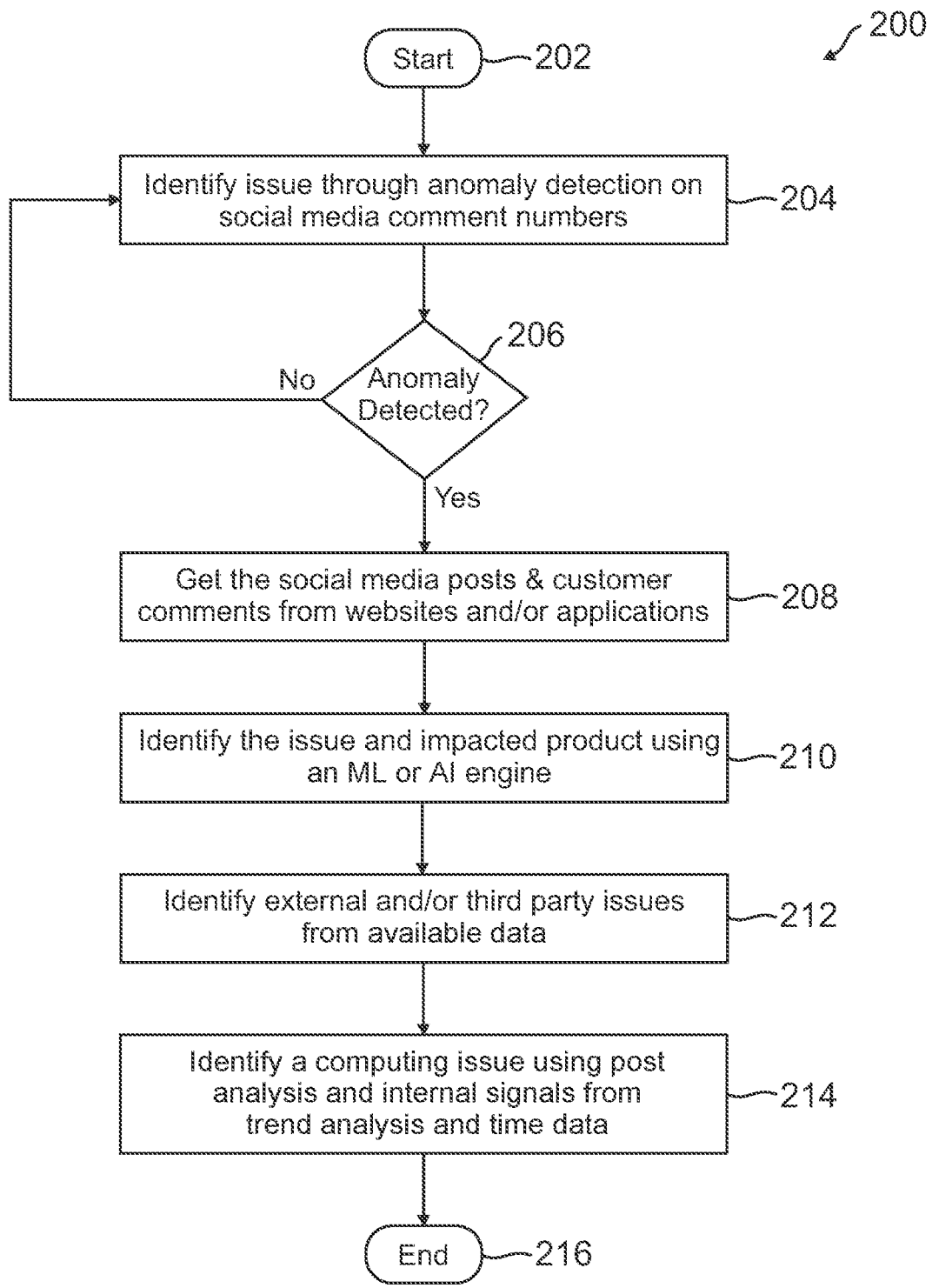
FIG. 2 illustrates an exemplary flowchart of operations of a ML model to identify an issue in a computing service and correlate the issue to corresponding computing signals of a service provider, according to an embodiment.

FIG. 2 illustrates an exemplary flowchart 200 of operations of a ML model to identify an issue in a computing service and correlate the issue to corresponding computing signals of a service provider, according to an embodiment. In flowchart 200, which may correspond to operations performed by service provider server 120 from system 100 of FIG. 1. In this regard, service provider server 120 may generate recommendations for issues in computing platforms based on the data shown in flowchart 200, such as based on the data and components from system 100 for FIG. 1.

At step 202 of flowchart 200, initially an ML model and/or engine of service provider server 120 may take, as input, information associated with social media posts and other social networking interactions of users on one or more social networks and/or via one or more social networking applications. These may include user interactions by the user and/or one or more other users within or using one or more of the social networking and/or media platforms. User interactions may include those with other users, service applications, and/or digital assets, which may indicate an interest, complaint, issue, or the like with such with those computing resources. Thus, at step 202, data, posts, comments, tweets, and other content on social media networks or sites are monitored and/or collected.

At step 204, the ML or other AI engine is utilized to identify an issue through anomaly detection on a number of social media comments and/or the context, sentiment, or other textual and/or image analysis from the social media comments. This may be done through detection of the number of comments, as well as correlation of those comments with particular positive or negative sentiments and/or language that may indicate an issue with a service or product provided by a service provider. Further, detection may occur at regular intervals, such as a set number of seconds, minutes, or the like. The number of social media comments, posts, images, or other data may be processed from a plurality of different forums, websites, and/or applications including Twitter, Downdetector, Disqus forms, Facebook posts, and the like. Thereafter, the anomaly detection may be run and detected/determined by the ML engine using one or more ML models. If no anomaly is detected at step 206, the process returns to 204 and continue executing steps for anomaly detection.

However, if at box 206, an anomaly is detected, diagram 200 proceeds to box 208 where social media comments and/or customer comments may be obtained from one or more websites and/or applications, such as those hosting and/or utilizing social networking platforms for social media posts. An anomaly may be detected based on a trend over time or at a specific point in time that is monitored resulting in a value, score, number of social media posts, or the like meeting or exceeding a threshold, such as a linear or other increase over time. However, certain increases in time may not be indicative of an issue. For example, a slow linear increase over time may be indicative of a product that is gaining popularity but not an issue in the product, and thus the corresponding threshold may be accordingly adjusted. However, quick spikes and/or exponential increases may be more indicative of bad sentiment and a computing issue. Detection of the anomaly may be based on a moving average or the like, such as a number of social media comments and an uptick or other change in such comments associated with a computing resource or service. Thus, an issue may be identified when such change occurs that corresponds to the computing service and the service provider may therefore identify that an issue is occurring. However, if no anomaly is detected at box 206, flowchart 200 returns to box 204.

At step 210, the issue and impacted product or service is identified using ML and/or other AI-based engines, such as through abstractive summarization, sentiment analysis, identifying prominent words, clustering of products/capabilities, or the like. Using the obtained social media posts, an ML engine having one or more trained ML models may be executed in order to determine the corresponding product or service offered to users and/or being used by users via computing platforms. For example, natural language processing, text mining, sentiment analysis, and text summarization may be performed by the ML models and/or rule-based engines. With abstractive summarization, an issue may be summarized but in different words and more concisely in order to provide different text by an ML model or other AI engine that is shorter. This may be done using Hugging Face's summarization algorithms. Through abstractive summarization, negative sentiments may be identified and parsed from the social media posts and comments. The abstractive summarization may therefor allow for identification and/or classification of a particular social media post as positive or negative, as well as allow for a confidence score to be generated toward this classification.

After sentiment analysis, the positive and the negative sentences and/or posts may be segregated, and within each set, sentences with low confidence scores may be filtered in order to keep a "positive-neutral" or "negative-neutral". From negative or neutral sentences, abstractive summarization may be performed in order to find prominent or common terms, such as those that appear a low in the social media posts and corresponding sentences. This may be done through ML models for Common Terms or TF-IDF (with N-Grams applied). This may also utilize Levenshtein distance and Phonetic Similarity Algorithms and this also can be for various languages. Prior to or during step 210, a corpus of available products may be built and/or accesses, and clustering of those products with the words and/or sentences from the social media posts, which may be done using K-Means or DBSCAN.

At step 212, external or third part issue are identified, if any exist or are available. An independent list of external third parties associated with the service provider may be accessed and/or utilized to identify any that may be reporting or identifying an uptick or increase is social media comment numbers at the same or similar time. Anomaly detection may also be run on such social media posts in order to determine if the issue is internal (e.g., with a product and/or service of a computing platform of the service provider) or is being seen and occurring on other service providers and/or third-party computing platforms (e.g., due to network issues, computing attacks, malicious actors, or the like). This may allow for identifying when the issue may not be an internal issue but an external one occurring with multiple independent online platforms.

At step 214, a computing issue is identified using post analysis and internal signals from trend analysis and time data. In some embodiments, correlation may also be done with external signals in order to determine whether the issue is a more widespread or external issue (e.g., network connectivity or bandwidth issue, location-specific issue in a geographic area, user device hardware or operating system issue, etc.). Customer comments may be correlated with internal signal and/or metrics based on the abstractive summarization and/or the clustering of the customer reported product and/or computing service. This may also include using the external or third-party issues that have been identified, if those are available and/or exist (e.g., are reported). The internal signals (TPV, logins, notifications, infrastructure metrics, etc.) along with changes that may be occurring to the service provider's website, applications, and/or other computing platforms. For example, internal signals may correspond to one or more applications, operations, and/or components. These internal signals may correspond to signaling and other data exchanges between different applications, services, and components, communications by components and/or internal users, testing and/or deployment of new applications and services, data storage and/or access requests, and the like. The internal signals may include signals resulting from failures or slowdowns (e.g., degradation in performance) in frontend or backend applications, services and/or interfaces.

In order to perform the operations of correlation at box 214, riskier changes around the start time and/or post time of the social media post may be identified, such as changes that may have occurred around the alert start time. A ML-based risk scoring algorithm may be run to identify riskier changes for review based on the changes made to the service provider's computing systems. These changes may be identified by reports and/or change requests that occur around or at the time of the reported incidents from the social media post(s), as well as risk assessment requests that a user may respond to and provide at or around the time of the change. A risk rating may be set based on the risk factors involved with the change, which may be low, moderate, or high. This risk rating may be based on the scope of the change, service isolation, impact, rollback capability, etc.

The ML-based analysis can be done by building a classifier to determine the risk level of a change to the service provider's systems. To build the classifier for the ML-based model and/or system, change data and the incident data (changes that caused incidents in the past) may be utilized from past data and feature engineering may be performed. The feature engineering may include features such as risk rating and other features that contribute to the overall risk of a change affecting a computing service or product. The ML model may utilize logistic regression as a supervised learning technique to predict the probability of a binary (e.g., yes or no) event occurring given a set of independent variables for the features. Thus, a logistic regression or other ML model may be built to predict if a change request is low risk or not. Thereafter the ML model may then be used with changes that were implemented around the time of the alert from the social media posts (e.g., past 30 minutes, hour, etc.) to identify whether the changes qualify as high enough risk to warrant review based on the social media posts causing the alert. Thus, the service provider may include internal signals including total payment volume (TPV), logins, payments, customer interactions, notifications, infrastructure metrics, etc. that include time serialized data.

For box 214, the service provider may fetch all the changes to the production site that were implemented around the time of the alert subjected all those changes to an ML risk assessment. High risk changes may be listed for deeper review. The service provider may identify anomalies in internal signals (TPV, logins, payments, customer interactions, notifications, infrastructure metrics, etc.) using anomaly detection techniques of time series data and/or a health check on important internal systems. Manual correlation analysis of different anomalies, high risk changes, metrics of the customer reported product, and the metrics of the external/third-party dependents (if any) during the alerted window (such as an alert time—30 minutes out from the alert). This would involve plotting all the metrics (different anomalies, high risk changes, other metrics) in a timeline fashion for the window (alert time—30 minutes out) and find out the correlation manually. However, the manual effort, based on the automated operations, may be limited to reviewing and correlating signals and changes that have some signs without the other manual processes that have been monitored.

Further, this can be automated by feeding the learning data to machine learning techniques and performing automated correlations after observing the manual efforts and data. The probable cause(s) from correlation along with supportive information may be shared to engineers for remediation through email/messaging. For example, if there was a change done to "Send Money Service" and the service provider may observe some anomalies with "TPV", "Payments", and "Customer Interactions" graphs. Also, in the previous steps, the service provider may have identified that the "Send Money" product is impacted and from abstract summarization, determine a result of "Could Not Send Money". Thus, the computing issue which was caused by a bad change to "Send Money Service" may be identified. A roll-back may be performed to the change to the "Send Money Service", and the issue may be resolved for customers.

At box 216, the data may then be correlated to the corresponding alerts generated based on social networking and/or media posts in order to identify anomalies in the time series data. During box 216, the identified anomalies may then be checked and/or notifications generated for a deeper review. For example, a health check of important and/or relevant internal system may then be checked for the time windows and a list may be generated for deeper review. The correlation analysis may be used to determine relationships in the corresponding data and based on the low or high-risk changes. An automated system may also identify certain software applications, subsystems, and/or hardware components that may be added, changed, and/or malfunctioning and causing the computing issue. This automated system may run tests against the identified computing issue and affected applications, interfaces, systems, and the like to identify these components causing the errors and/or issues, as well as what is causing the issues (e.g., new version of an application that has an error, slowdown or bottlenecking due to traffic flow or redirection, offline component, etc.). Such information may be transmitted in the notification and/or used to automatically perform troubleshooting and repair of the affected component.

Figure 3:
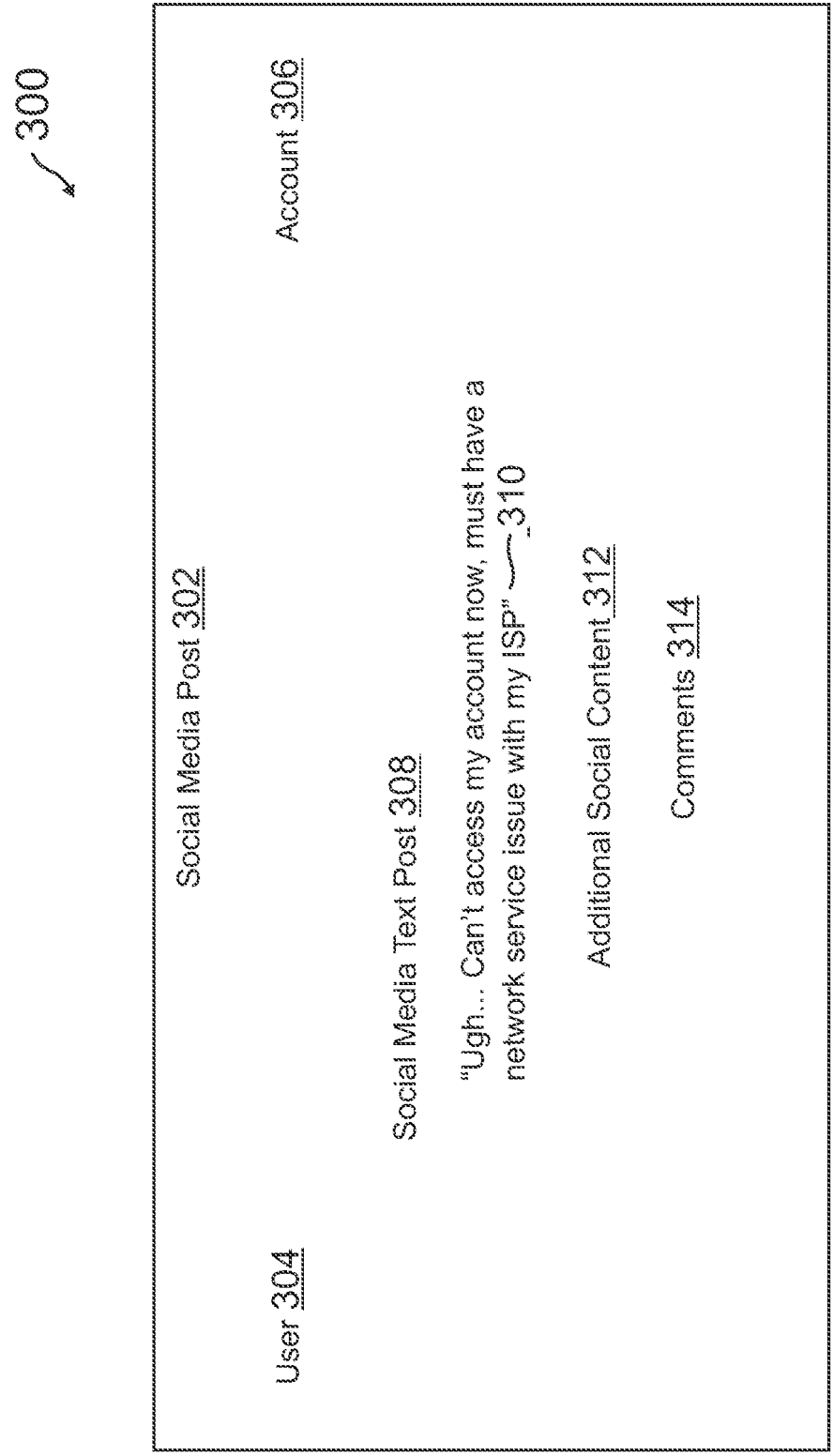
FIG. 3 illustrates exemplary social media post that may be analyzed in order to provide recommendations and/or output for computing issues based on the social media post, according to an embodiment.

FIG. 3 illustrates exemplary block diagram 300 of a social media post that may be analyzed in order to provide recommendations and/or output for computing issues based on such social media, according to an embodiment. Diagram 300 in FIG. 3 includes a social media post 302 provided by client device 110 and processed by service provider server 120 discussed in reference to system 100 of FIG. 1. The interactions and components in diagram 300 may be used to provide recommendations and/or alerts of issues with computing systems, services, and/or products based on user interactions and posts on social networking platforms.

In this regard, a social networking platform may be utilized to provide social media post 302 on the social media platform. Social media post 302 may be provided by a user 304, such as through an account 306 on a social media platform or service, which may be accessed through the social media and/or networking platform. In this regard, social media post 302 may be monitored and/or collected by service provider server 120 in order to detect whether there are any ongoing or detected issues with computing services and/or products provided by service provider server 120. User 304 may be identified in social media post 302 (e.g., through a personal name, username on the platform, identifier, or the like), which may be associated with account 306 that may include a visible or non-visible account name or identifier in social media post 302 (e.g., additional account information identifying user 304, such as an image, graphic, etc., for the account). In some embodiments, user 304 and/or account 306 need not be identified, however, identification may assist in filtering spam or bot accounts, malicious accounts, and the like, as well as trusted accounts, news reporting users and/or accounts, automated bot accounts to report computing issues (e.g., Down Detector), and the like.

Social media post 302 may include social media text post 308, which includes text 310 stating "Ugh . . . can't access my account now, must have a network service issue with my ISP." Social media text post 310 may include data necessary for determination of the potential computing issue, as well as if that issue is service provider specific or occurring across a larger network and/or group of service providers. A ML model or other AI engine may be executed and run in order to process the text data from text 310, including performing a sentiment analysis, check of the same or similar reports or posts with other external sources and/or third party service providers, and/or correlation with internal computing signals and/or messages of the service provider. Once performed, the service provider may identify any issues reported by user 304 on account 306 based on social media text post 308 using the operations discussed in diagram 200 of FIG. 2. While a single post is shown in diagram 300, multiple posts may similarly be monitored, scraped, and/or obtained by the service provider for analysis. For example, a threshold or required number of posts may be processed to identify computing issues, such as 100, 1,000, or 10,000, before a trend may be identified and correlated to internal signals accurately.

Additionally, social media post 302 may further include additional social content 310, which may include emojis, images, graphical icons, or the like, as well as comments 312. Comments 312 may further be processed and/or parsed by the ML engine in order to determine if additional users are providing feedback and/or reporting the same or similar issues. Thus, the ML or other AI engine may further perform sentiment analysis and/or matching of the content from additional social content 310 and/or comments 312 in order to match to internal signals and/or correlate with external third party issues and/or reports. In some embodiments, computing issues may be region specific, such as a particular location, region, city, state, country, or the like. As such, a geo-location of social media post 302 may be provided in order to affiliate posts with particular locations and regions for more granular investigation of computing issues.

Figure 4:
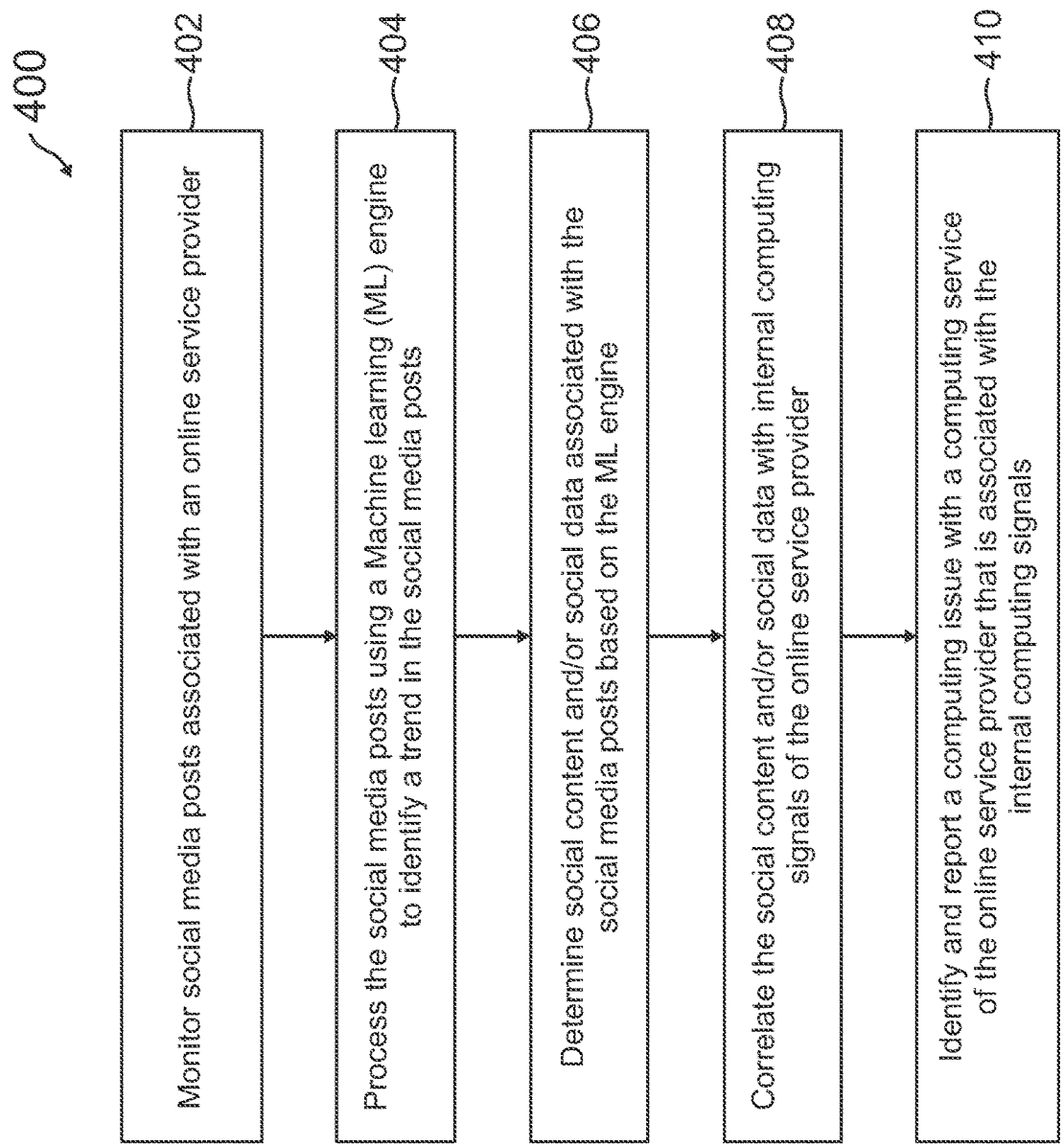
FIG. 4 illustrates a flowchart for operations for identification of computing issues on computing platforms using social media comments and other available data in a variety of environments, according to an embodiment.

FIG. 4 illustrates a flowchart 400 for operations for identification of computing issues on computing platforms using social media comments and other available data in a variety of environments, according to an embodiment. Note that one or more steps, processes, and methods described herein of flowchart 400 may be omitted, performed in a different sequence, or combined as desired or appropriate.

At step 402 of flowchart 400, social media posts associated with an online service provider are monitored. These may include posts on different social networking or media platforms, such as text, video, emoji or graphical image based, and the like posts. Such posts may indicate an ongoing issue with one or more computing services of the online service provider, such as those cause by a computing issue with a service and/or a platform or service that may be down or having connectivity or bandwidth issues. This may be caused by network connectivity issues or may be caused by issues with the service providers computing platforms and/or servers.

At step 404, the social media posts are processed using an ML engine to identify a trend in the social media posts. In some embodiments, some users may suffer from short term issues in computing service availability, which may not be widespread and/or may be localized to certain areas, such as based on network availability. However, larger network connectivity issues may arise and cause larger outages and/or bandwidth or speed issues for computing resources. Thus, a trend in the social media posts may be identified for particular regions, times, locations, demographics, user accounts, or the like in the reporting of issues with computing availability from the service provider.

At step 406, social content and/or social data associated with the social media posts are determined based on the ML engine. The social content and/or social data may be determined based on a sematic and/or textual analysis of the corresponding text data within the social media post. The ML engine may include one or more ML models to perform text and/or image based text analysis on the corresponding data to extract semantics and other sentiment from corresponding images and text in social media posts. This may be done to determine the social content, context, and/or other data available in such posts.

At step 408, the social content and/or social data is correlated with internal computing signals of the online service provider. For example, the social content and/or other data may be correlated to an ongoing internal and/or external signal of the online service provider that corresponds to a computing service provided but such service provider. This may allow for identification of issues in computing services being provided by the service provider. At step 410, a computing issue with a computing service of the online service provider that is associated with the internal computing signals is identified and reported. The computing issue may be identified based on the computing signals that have been correlated to the content, context, sentiment, or the like from the social media posts. Thus, real-time updates and/or notifications may be performed for computing issues of the service provider.

Figure 5:
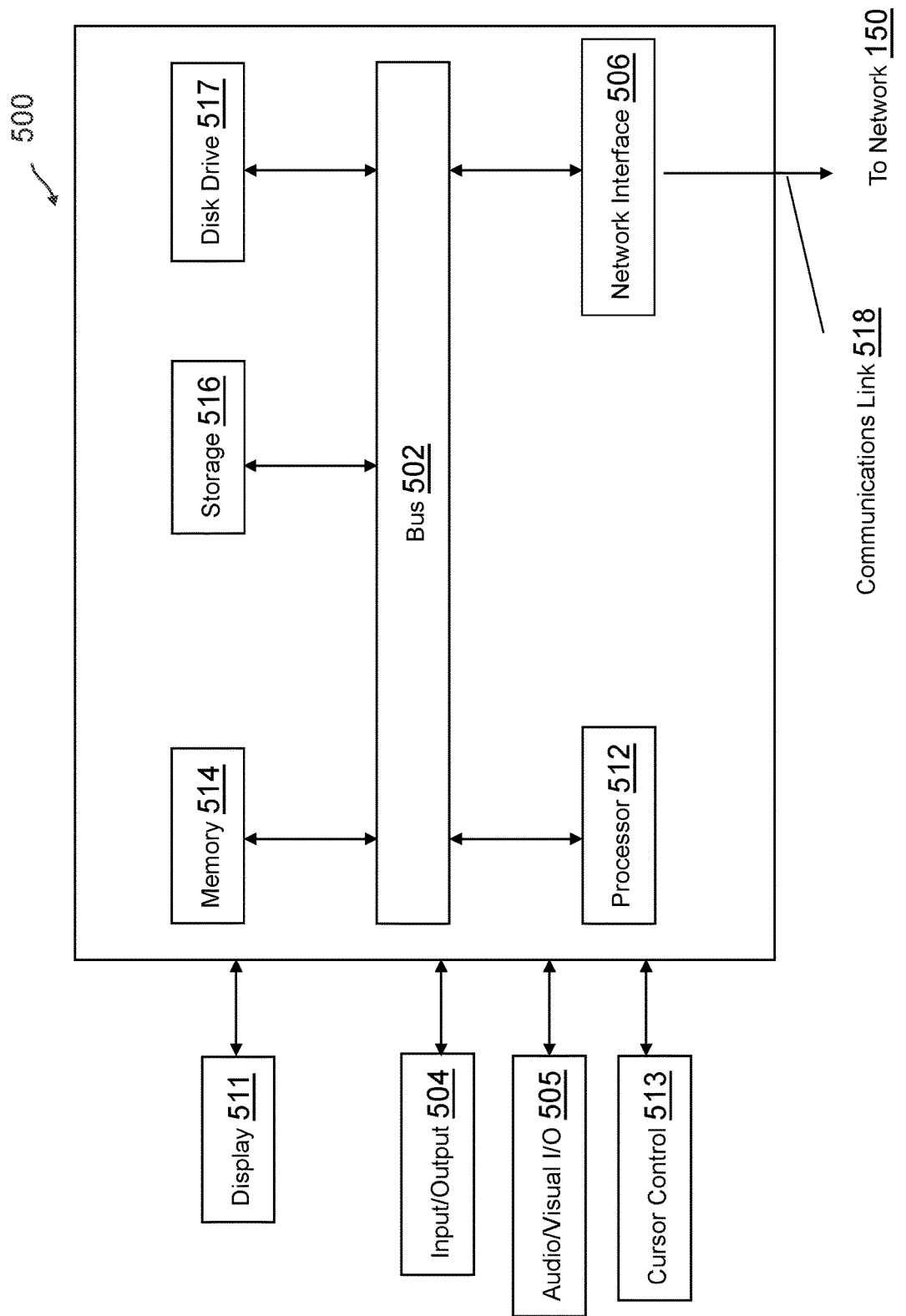
FIG. 5 illustrates a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
  a non-transitory memory; and
  one or more hardware processors coupled to the non-transitory memory and configured to read instructions from the non-transitory memory to cause the system to perform operations comprising:
    monitoring a plurality of social media posts associated with an online service provider;
    identifying, from a plurality of computing platforms, a computing platform related to the plurality of social media posts based on analyzing content associated with the plurality of social media posts;
    determining a computer condition associated with the computing platform based on sentiments determined from the plurality of social media posts using a machine learning (ML) model, wherein the ML model comprises a plurality of nodes within a hidden layer, and wherein parameters associated with the plurality of nodes have been adjusted based on a training of the ML model;
    analyzing functionalities provided by the computing platform;
    identifying one or more third-party computer components utilized by the computing platform based on the analyzing;
    monitoring network signals exchanged between the computing platform and the one or more third-party computer components;
    detecting no network degradation exceeding a threshold between the computing platform and the one or more third-party computer components based on the network signals exchanged between the computing platform and the one or more third-party computer components;
    determining that the computer condition is internal within the computing platform based on the sentiments determined from the plurality of social media posts and an absence of a network degradation exceeding the threshold between the computing platform and the one or more third-party computer components; and
    in response to determining that the computer condition is internal within the computing platform, automatically modifying programming code associated with the computing platform based on one or more changes that have been applied to the programming code within a threshold period of time.

2. The system of claim 1, wherein the operations further comprise:
  identifying a type of sentiments from the plurality of social media posts based on a sentiment analysis performed by the ML model,
  wherein the determining the computer condition is based on the type of sentiments.

3. The system of claim 1, wherein the computing platform is associated with one of a web application or a mobile application provided by the online service provider.

4. The system of claim 1, wherein the modifying the programming code comprises performing a roll-back on the programming code based on the one or more changes that have been applied to the programming code.

5. The system of claim 1, wherein the operations further comprise:
  performing an abstractive summarization of the plurality of social media posts based on text data in the plurality of social media posts and using a text summarization ML model.

6. The system of claim 1, wherein the operations further comprise:
  filtering the plurality of social media posts based on a timestamp associated with each of the plurality of social media posts.

7. The system of claim 1, wherein the operations further comprise:
  clustering the plurality of social media posts based on the content within the plurality of social media posts; and
  correlating different clusters of the plurality of social media posts to one or more products or one or more computing capabilities provided by the online service provider.

8. The system of claim 1, wherein the operations further comprise:
  providing an output notification associated with the computer condition, wherein the output notification comprises at least one of a graph associated with the plurality of social media posts or an indication of a change to a product or an application associated with the computer condition.

9. A method comprising:
  identifying, by a computer system, a social media post associated with a computing service provided by an online service provider;
  determining, by the computer system, a set of data summarizing the social media post based on performing at least one of a text mining operation, a sentiment analysis, or a summarization of the social media post using a machine learning (ML) model trained based on a corpus of previous social media posts, wherein the ML model comprises a plurality of nodes within a hidden layer, and wherein parameters associated with the plurality of nodes have been adjusted based on a training of the ML model;

determining, by the computer system, a computer condition associated with one or more computing platforms of the online service provider based on the set of data;

identifying, by the computer system, one or more third-party computer components utilized by the one or more computing platforms based on analyzing functionalities performed by the one or more computing platforms;

monitoring, by the computer system, signals exchanged between the one or more computing platforms and the one or more third-party computer components via a network;

determining, by the computer system, no network degradation exceeding a threshold between the one or more computing platforms and the one or more third-party computer components based on the signals exchanged between the one or more computing platform and the one or more third-party computer components;

determining, by the computer system, that the computer condition is internal within the one or more computing platforms based on the set of data and an absence of a network degradation exceeding the threshold between the one or more computing platforms and the one or more third-party computer components; and in response to determining that the computer condition is internal within the one or more computing platforms, automatically modifying, by the computer system, programming code associated with the one or more computing platforms based on one or more previous changes applied to the programming code within a threshold time period.

10. The method of claim 9, wherein the determining the set of data is based on performing the summarization of the social media post, and wherein the summarization of the social media post comprises a reduction in text for the social media post based on a summarization algorithm utilized by the ML model.

11. The method of claim 9, wherein the determining the set of data is based on performing the sentiment analysis and the summarization of the social media post, and wherein the method further comprises:

identifying a set of sentiments of a particular type in a plurality of social media posts including the social media post based on the sentiment analysis performed by the ML model; and generating the summarization based on the set of sentiments.

12. The method of claim 9, wherein the determining the set of data is based on performing the text mining operation, and wherein the text mining operation comprises identifying a set of common terms or common combinations of terms shared in a plurality of social media posts including the social media post.

13. The method of claim 9, wherein the computing service is associated with at least one of a computing product or a computing capability of the online service provider.

14. The method of claim 9, further comprising:

determining operations of the one or more third-party computer components based on the signals, wherein the determining that the computer condition is internal within the one or more computing platforms is further based on the operations of the one or more third-party computer components.

15. The method of claim 9, wherein the social media post is part of a plurality of social media posts, and wherein the method further comprises:

identifying a trend based on the plurality of social media posts, wherein the computer condition is determined further based on the trend.

16. A non-transitory machine-readable medium having stored thereon machine-readable instructions executable to cause a machine to perform operations comprising:

receiving a social media post regarding a computing application for an online platform of an online service provider;

determining social data corresponding to the social media post based on executing a machine learning (ML) model trained for analyzing text data of the social media post based on a corpus of previous social media posts, wherein the social data is associated with a sentiment corresponding to a computing resource provided by the online service provider, wherein the ML model comprises a plurality of nodes within a hidden layer, and wherein parameters associated with the plurality of nodes have been adjusted based on a training of the ML model;

identifying one or more third-party computer components utilized by the computing application based on analyzing functionalities provided by the computer resource;

monitoring signals exchanged between the computing application and the one or more third-party computer components;

determining no network degradation exceeding a threshold between the computing application and the one or more third-party computer components based on the signals exchanged between the computing application and the one or more third-party computer components;

determining that an internal computer issue exists within the computing application based on the social data corresponding to the social media post and an absence of a network degradation exceeding the threshold between the computing application and the one or more third-party computer components; and in response to determining that the internal computer issue exists within the computing application, automatically modifying programming code associated with the computing application.

17. The non-transitory machine-readable medium of claim 16, wherein the operations further comprise:

generating a trend analysis and a notification associated with the internal computer issue for the computing application.

18. The non-transitory machine-readable medium of claim 16, wherein the determining the social data is based on at least one of a text mining, a sentiment analysis, or a summarization performed by the ML model.

19. The non-transitory machine-readable medium of claim 16, wherein the determining the social data comprises generating an abstractive summarization of the text data in the social media post utilizing a Hugging Face deep learning algorithm associated with the ML model.

20. The non-transitory machine-readable medium of claim 16, wherein the determining the social data further comprises:

filtering a plurality of social media posts based on sentiments of a particular type; and identifying the social media post from the plurality of social media posts based on the sentiments.

* * * * *